United States Patent
Byrnes et al.

(10) Patent No.: US 10,366,108 B2
(45) Date of Patent: Jul. 30, 2019

(54) DISTRIBUTIONAL ALIGNMENT OF SETS

(71) Applicant: SRI International, Menlo Park, CA (US)

(72) Inventors: John Byrnes, Poway, CA (US); Christina Freyman, Falls Church, VA (US)

(73) Assignee: SRI International, Menlo Park, CA (US)

( * ) Notice: Subject to any disclaimer, the term of this patent is extended or adjusted under 35 U.S.C. 154(b) by 542 days.

(21) Appl. No.: 14/862,101

(22) Filed: Sep. 22, 2015

(65) Prior Publication Data

US 2016/0378847 A1   Dec. 29, 2016

Related U.S. Application Data

(60) Provisional application No. 62/185,046, filed on Jun. 26, 2015.

(51) Int. Cl.
*G06F 16/28* (2019.01)
*G06F 16/93* (2019.01)

(52) U.S. Cl.
CPC ............ *G06F 16/285* (2019.01); *G06F 16/93* (2019.01)

(58) Field of Classification Search
CPC ......... G06F 17/30598; G06F 17/30011; G06F 16/285; G06F 16/93
See application file for complete search history.

(56) References Cited

U.S. PATENT DOCUMENTS

| | | | | |
|---|---|---|---|---|
| 7,299,247 | B2* | 11/2007 | Calistri-Yeh | G06F 17/30731 |
| 7,636,732 | B1* | 12/2009 | Nielsen | G06F 17/3064 |
| 8,903,825 | B2* | 12/2014 | Parker | G06F 17/3071 |
| | | | | 707/737 |
| 2009/0216639 | A1* | 8/2009 | Kapczynski | G06F 17/30569 |
| | | | | 705/14.1 |
| 2014/0095150 | A1* | 4/2014 | Berjikly | G06F 17/2785 |
| | | | | 704/9 |

OTHER PUBLICATIONS

Inderjit S. Dhillon ,"Co-clustering documents and words using bipartite spectral graph partitioning", Proceeding KDD '01 Proceedings of the seventh ACM SIGKDD international conference on Knowledge discovery and data mining pp. 269-274 , Aug. 26-29, 2001.*

"Qiaozhu Mei, Xuehua Shen, Chengxiang Zhai", "Automatic Labeling of Multinomial Topic Models", Aug. 12-15, 2007, University of Illinois at Urbana Champaign (Year: 2007).*

* cited by examiner

*Primary Examiner* — Mark D Featherstone
*Assistant Examiner* — Faezeh Forouharnejad
(74) *Attorney, Agent, or Firm* — Hickman Palermo Becker Bingham LLP; Christine E. Orich

(57) ABSTRACT

Technology for classifying a data set includes extracting one or more features from items of the data set, computing a specificity measure for the extracted features, and measuring the similarity of the extracted features to a set of characteristic features associated with the property of one or more reference models.

30 Claims, 3 Drawing Sheets

DISTRIBUTIONAL ALIGNMENT OF SETS

CROSS-REFERENCE TO RELATED APPLICATIONS

This application claims the benefit of and priority to U.S. Provisional Patent Application Ser. No. 62/185,046, filed Jun. 26, 2015, which is incorporated herein by this reference in its entirety.

GOVERNMENT RIGHTS

This invention was made in part with government support under contract nos. NSFDACS11T1180, NSFDACS13T1163 awarded by the National Science Foundation. The United States Government has certain rights in this invention.

BACKGROUND

Managers of large projects in corporations, governments, and other entities use big data to provide a snap shot of their respective project's development. For example, policy makers in governments frequently ask governmental agencies how much money they are spending on research and development activities in a specific field or topic. Frequently, such requests are oriented to understanding how the many projects of an entity relate to overarching socioeconomic objectives, such as knowing how much money is being spent on green energy initiatives. Records in most entities are rarely classified in ways that provide easy answers to these ever-changing socioeconomic objectives.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
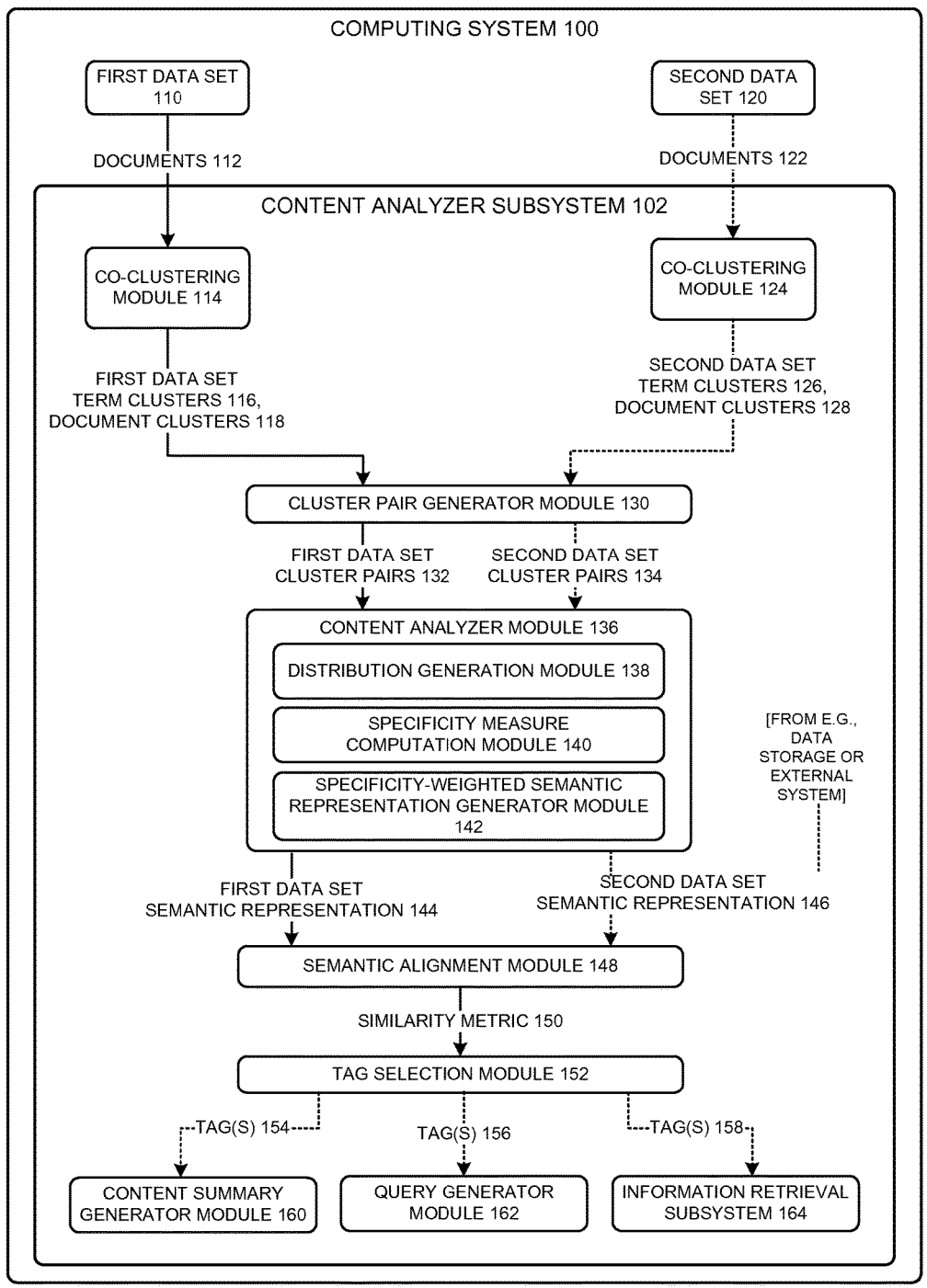
FIG. 1 is a simplified schematic diagram of at least one embodiment of an environment of a computing system comprising a content analyzer subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Users of unstructured data, such as natural language text, images, and video, frequently need to glean useful information from the unstructured data. For example, decision makers may want to know how much money they are spending on certain activities according to specific classification criteria, such as scientific disciplines, technical fields, commercial markets, business units, or other topics or categories. The requests for information may be related to achieving specific objectives, such as a desire to know how much funding is being spent on particular types of projects. As used in this patent application, a "document" may refer to any piece of electronic content that may be compiled into a collection of information. For example, a document may include a text file, an audio file, a digital video file, a multimedia data file, or any other type of data file. As used in this patent application, a "data set" may refer to any collection of documents or files that are searchable. As used in this patent application, a "term" may refer to a word or a phrase. More generally, a data set (such as an unstructured data set) may comprise a plurality of items (such as documents), where each item in the data set has a number of features (e.g., terms).

Previous methods of analyzing large data sets are limited in their applications. For example, performing keyword searches on a data set may yield inconsistent results in the absence of a widely used ontology to describe various activities of interest. In another example, a structured tagging system may be used to organize a data set in such a way that information is easily accessible. However, tagging is limited by the predefined categories and by the perspective, approach, or objective of the entity doing the tagging. In many instances, the entity performing the tagging function (e.g., a human or a computer) may misapply a tag, either by tagging a document in a data set with a misleading tag, or by failing to tag a document in a data set with the most salient tags. Additionally, areas of interest may change over time, so the tags applied to documents years ago may not be of interest now. Moreover, when different types of data sets are sought to be analyzed together, or are actually combined, the tags previously applied to one of the data sets may or may not be the most suitable descriptors for the other data set, or for the combined data set.

Referring to FIG. 1, in one embodiment, a content analyzer subsystem 102 executable by a computing device 100 is shown. The illustrative embodiment (e.g., native or virtual "runtime" or "execution" environment) of the computing system 100 includes the content analyzer subsystem 102. The computing system 100 is capable of storing any number of items (e.g., documents or sets of documents) and the content analyzer subsystem 102 is capable of comparing any number of data sets (e.g., corpora) of information. In the illustrative embodiment, the content analyzer subsystem 102 receives or accesses a first data set 110 of information composed of documents 112 and a second data set 120 of information composed of documents 122. For ease of discussion, only the comparison of the first data set 110 to the second data set 120 will be discussed, but it should be appreciated that more data sets may be compared at any given time by the content analyzer subsystem 102. As discussed above, a document may be embodied as any type of electronic data file. The first data set 110 and the second data set 120 may be stored locally on the computing system 100, or may be stored elsewhere, depending on the application. In the event that the first data set 110 and the second data set 120 are stored external to the computing system 100, the computing system 100 is able to access the two data sets via one or more networks (as will be discussed in greater detail below). The first data set 110 and the second data set 120 are shown merely as illustrative examples, the computing system 100 and the content analyzer subsystem 102 may be configured to store and analyze any number of data sets of documents. The computing system 100 includes any requisite communication mechanism and protocols needed for effectuating a similarity analysis of the chosen data sets.

The illustrative content analyzer subsystem 102 is embodied as a number of machine-readable components, such as instructions, modules, data structures and/or other components, which may be implemented as computer hardware, firmware, software, or a combination thereof. Portions of the content analyzer subsystem 102 may be executed by other computing devices in communication with computing system 100, as described below with reference to FIG. 3.

In the illustrated embodiments, the content analyzer subsystem 102 uses co-clustering techniques to extract features (e.g., terms) from one or more data sets, and uses a weighting algorithm to prioritize the extracted features according to specificity. In other embodiments, the content analyzer subsystem 102 identifies and prioritizes the extracted features based on distinctiveness of the features with respect to the data set as a whole (e.g., based on an evaluation of the number of items in which the extracted feature occurs). That is, the evaluation of extracted features is performed without going through any kind of clustering process, in some embodiments.

The content analyzer subsystem 102 receives the documents 112 of the first data set 110 and applies a co-cluster algorithm 114 to those documents 112, partitioning the first data set into a set of first data set term clusters 116 and a set of first data set document clusters 118. In some embodiments, the content analyzer subsystem 102 receives the documents 122 of the second data set and applies a co-clustering algorithm 124 to the second data set 120 thereby partitioning the second data set 120 into a set of second data set term clusters 126 and a set of second data set document clusters 128. In other embodiments, the second data set 120 is not co-clustered and the content analyzer subsystem 102 uses documents 122 in later processing, for example, the documents 122 are input into a cluster pair generator 130 instead of the term clusters 126 and the document clusters 128.

In some embodiments, the second data set 120 is embodied as a model, a pre-defined classification scheme, a plurality of models, such as a plurality of language models, where each of the models comprises a set of characteristic features (e.g., characteristic terms) associated with a property of the model (or second data set), where the property relates to a classification criterion. For example, in some embodiments, the classification criterion or property may be a scientific discipline like "biology" and the set of characteristic features may include terms that are commonly associated with biology, such as "cell," etc. Of course, any type of classification criterion can be used depending on the subject matter or characteristics of the data set or the objective of the classification effort. In some embodiments, the first and second data sets 110, 120 comprise different types of documents, e.g., one data set may comprise patent abstracts, or patent claims, while the other data set may comprise full-text patent specifications or published articles relating to a particular technical field.

For ease of description, the co-clustering algorithm 114 will be described in relationship to the first data set 110 of documents 112. It should be appreciated, however, that all descriptions of the co-clustering algorithm 114 related to the first data set 110 also apply to the co-clustering algorithm 124 of the second data set 120 and to any other data set that may be co-clustered. An illustrative example of software that may be used to perform co-clustering is Co-Cluster Version 1.1, available at: www.cs.utexas.edu/users/dml/Software/co-cluster.html. In the illustrative embodiment, the co-clustering algorithm 114 simultaneously partitions the first data set 110 into a set of first data set term clusters 116 and a set of first data set document cluster 118. By simultaneously partitioning the first data set 110 into term clusters 116 and document clusters 118, the co-clustering algorithm 114 minimizes the loss of information from the raw data.

In the illustrative embodiment, the co-clustering algorithm is a form of natural language processing. More specifically, it is a form of unsupervised machine learning where information is generated solely from the language contained in the surveyed content (e.g., the first data set 110) without reference to categorizations done by people. The set of term clusters 116 of the first data set 110 is composed of a number individual term clusters, any individual term cluster in the set of term clusters 116 is denoted as term cluster i. Each individual term cluster i is composed of a collection of terms m found in the first data set 110 Similarly, the set of document clusters 118 of the first data set 110 is composed of a number of individual document clusters, any individual document cluster in the set of document clusters 118 is denoted as document cluster j. Each individual document cluster j is composed of a collection of documents n found in the first data set 110. Each document n is selected from the set of documents 112. The co-clustering algorithm 114 uses unsupervised learning techniques to sort terms m into individual term clusters i and documents n into individual document cluster j. The co-clustering algorithm 114 identifies relationships between words or phrases found in the first data set 110 using statistical methods and determines the set of term clusters 116 and the set of document clusters 118 based on these relationships. The unsupervised learning techniques allow the first data set 110 to be sorted and organized without the manual effort of users being involved in the process.

In the illustrative embodiment of the co-clustering algorithm 114, each term m found in the first data set 110 is assigned to exactly one term cluster i, and each document n found in the first data set 110 is assigned to exactly one document cluster j.

In alternative embodiments, terms and documents 112 of the first data set 110 may assigned to multiple clusters 116, 118. For example, topic modeling through Latent Direchlet Allocation (LDA) is an unsupervised machine learning technique where terms and documents are assigned to multiple topic clusters. Under the LDA model, each document is composed of a probability distribution over "topics" (these are the latent variables to be inferred by the model) and each topic is composed of a probability distribution over each term cluster.

In some embodiments, the co-clustering algorithm 114 may also include the use of a manual specification approach to organize the first data set 110 into clusters. In a manual specification approach, a user designs a controlled vocabulary of tags to assign to the documents 112. These types of vocabularies are called taxonomies or ontologies and may have associated definitions. Taxonomies can provide an external reference classification system, and thus can identify and track specific topics in a more reliable and consistent manner These taxonomic vocabularies may include an association for each tag with a set of related words. Each set of related words may be referred to as a language model. When the language models provide a sufficiently rich language set around the tags in the classification, term clusters 116 and document clusters 118 found by unsupervised methods within the surveyed content (e.g., the first data set 110) may be mapped into the external reference vocabulary. Combining manual specification methods with unsupervised learning techniques enables different data sets of information to be mapped to the same reference system.

In some embodiments, the manual specification approaches uses association grounded semantics to compare term clusters 116 to document clusters 118. In association grounded semantics, each language model is represented by a probabilistic distribution over term clusters 116, and each document cluster 118 in the surveyed content (e.g., first data set 110) is represented by a probabilistic distribution over term clusters 116. By comparing these two distributions, the relevancy of each language model to each document cluster 118 can be determined based on information-theoretic similarity metrics, such as, for example, the Kullback-Liebler (KL) divergence. Once a divergence between language models and document clusters 118 has been determined, document clusters 118 can be assigned to the nearest language model.

Once the first data set 110 of information is organized into a set of term clusters 116 and a set of document clusters 118 by the co-clustering algorithm 114, the cluster pair generator 130 organizes the clusters into first data set cluster pairs 132 and second data set cluster pairs 134. Each cluster pair 132, 134 is composed of at least one term cluster or at least one document cluster derived from any data set and another piece of data. In some embodiments, each cluster pair 132, 134 is composed of one individual term cluster i and one individual document cluster j. Consequently, at times an individual cluster pair 132, 134 may be denoted as $CP_{ij}$. While the above description has principally described only the clusters of the first data set, the cluster pair generator 130 is configured to generate cluster pairs that include term clusters generated from one data set and compare them to document clusters generated from a different data set. For example, the cluster pair generator 130 is configured to generate cluster pairs composed of term clusters chosen from the set of term clusters 116 and document clusters chosen from the set of document clusters 118. In another example, the cluster pair generator 130 is configured to generate cluster pairs composed of term clusters chosen from the set of term clusters 116 and document clusters chosen from the a second set of document clusters 128 generated from the second data set 120. In the illustrative embodiment, the cluster pair generator 130 creates two distinct sets of cluster pairs, the first data set cluster pairs 132 and the second data set cluster pairs 134. The first set of cluster pairs 132 includes a pairing of every term cluster 116 with every document cluster 118 and the second set of cluster pairs 132 includes a pairing of every term cluster 116 with every document cluster 128. In other embodiments, the cluster pair generator 130 creates other sets of cluster pairs, for example, creating cluster pairs 132 composed of individual term clusters chosen from a set of term clusters 126 derived from the second data set 120 and individual document clusters chosen from the set of document cluster 128 also derived from the second data set 120. In other embodiments, the sets of cluster pairs 132 may include less than all of the possible pairings of clusters. In yet other embodiments, each cluster pair in a set of cluster pairs may include a term cluster 116 and a document 122. In general, the cluster pair generator 130 is configured to select one or more sets of data that are of interest to a user when comparing two data sets. The cluster pair generator 130 may be configured to generate many different sets of cluster pairs, where some sets of cluster pairs include data from multiple data sets and other sets of cluster pairs include data from only one data set. In yet another embodiment, the set of cluster pairs 134 are composed of a term cluster 126 and a document cluster 128.

The content analyzer module 136 is configured to compare the first data set 110 to the second data set using the cluster pairs 132, 134. The content analyzer module 136 includes a distribution generation module 138, a specificity measure computation module 140, and a specificity-weighted semantic representation generator module 142. The distribution generation module 138 is configured to generate probability distributions over the cluster pairs 132, 134. The probability distribution is indicative of a similarity between the two pieces of data in each cluster pair 132, 134, for example, in an illustrative cluster pair 132 includes a term cluster 116 and a document cluster 118. For example, the probability value for a specific cluster pair $CP_{ij}$ is a probabilistic determination based on how frequently the terms m of the term cluster i appear in the documents n of the document cluster j. In the illustrative embodiment, the distribution generation module 138 generates a probability distribution over all cluster pairs 132 that are composed of the term clusters 116 and the document clusters 118, and generates a second probability value for each cluster pair 134 that is composed of a term cluster 126 and a document cluster 128. In other embodiments, the distribution generation module 138 generates probability distributions for cluster pairs that include both clustered data (e.g., term clusters 116) and unclustered data (e.g., documents 122), where the probability distribution is indicative of how frequently a term m of the term cluster i appears in a document n of documents 122.

Once probability distributions are determined for each cluster pair 132, 134 generated by the cluster pair generator 130, the specificity measure computation module 140 is configured to generate a specificity measure for each cluster pair 132, 134. The specificity measure is indicative of how unique the occurrence of the individual term cluster i of a specific cluster pair ij is to the individual document cluster j of the relevant cluster pair ij. For example, certain term clusters appear in nearly all document clusters found in a data set of information, while other term clusters appear in a relatively few document clusters of the data set of information. In the illustrative embodiment, term clusters that appear in relatively few document clusters are presumed to be more valuable in determining the content of a document cluster than term clusters that appear in all document clusters. Thus, term clusters that occur in many or all of the document clusters are considered less-content carrying and term clusters that appear in some, but not all, of the document clusters are labeled as more content carrying. In the illustrative embodiment, each cluster pair is made up of two pieces of data, which are pulled from two different sources. The specificity measure is indicative of how unique the occurrence of the first set of data of the cluster pair is in the second set of data of the cluster pair, e.g. based on a comparison of the first set of data to each piece of data in or related to the second set of data.

In some embodiments, for a specific cluster pair ij, the specificity measure is indicative of the relative dispersion of the occurrences of the term cluster i across all of the document clusters related to the document cluster j. For example, if a cluster pair ij is composed of a specific term cluster i from the set of term clusters 116 and a document cluster j from the set of document clusters 118, the specificity measure is indicative of the relative dispersion of occurrences of the specific term cluster i across all of the document clusters 118. In other embodiments, the specificity measure is indicative of an expected count of occurrences of the terms m of the term cluster i in any specific document cluster j, if the term cluster i and the document cluster j were statistically independent.

In the illustrative embodiment, the specificity measure is determined using pointwise mutual information (PMI). Pointwise mutual information is the logarithm of the ratio between an observed count terms m of the relevant term cluster i that occur in the relevant document cluster j and an expected count of terms m that should occur in the document cluster j if the term cluster i and the document cluster j were statistically independent. In other embodiments, we may use this ratio without taking its logarithm, and we will refer to this ratio as PMI also. For example, the terms m of a particular term cluster i chosen from the term clusters 116 may occur an average of 10 times in all document clusters 118 derived from the first data set 110. However, in a specific document cluster j chosen from the document clusters 118, the terms m of the term cluster i may occur more than average, for example, the terms m occur 30 times. The specificity measure of the cluster pair ij would reflect that the terms m of the term cluster i occur three times more than is expected based on the average occurrences of the terms m across the entire first data set 110.

To illustrate pointwise mutual information, consider the experiment of selecting an arbitrary occurrence of any term from any document in the entire set (with equal probability on all occurrences). Let Pr(T=i, D=j) be the probability that the selected occurrence was an occurrence of a term from term cluster i and that it occurred in a document from document cluster j. From this the weighted probability parameter is defined as:

$$R(i, j) = \frac{Pr(T = i, D = j)}{Pr(T = i)Pr(D = j)} \quad (1)$$

R(i, j) is the ratio between the observed count of terms from term cluster i occurring in the documents from document cluster j and the count that would be expected if term cluster i and document cluster j were independent.

The specificity-weighted semantic representation generator module 142 is configured to generate a first data set semantic representation 144 for each cluster pair 132 and a second data set semantic representation 146 for each cluster pair 134. The semantic representations 144, 146 are based on probability distributions and the specific measures already generated for each cluster pair 132, 134. In the illustrative embodiment, the semantic representations 144, 146 are obtained by multiplying the probability distributions by the specificity measure and normalizing that value.

The semantic representations 144, 146 for each set of cluster pairs 132, 134 are output to a semantic alignment module 148 that is configured to determine the similarities between the data sets being analyzed, for example, the similarities between the first data set 110 and the second data set 120. To compare data sets, the content analyzer subsystem 102 applies the term clustering learned from one data set to another data set. In some embodiments, the content analyzer subsystem 102 applies the term clustering learned from one data set to the clustered data learned from another data set. In other embodiments, the content analyzer subsystem 102 applies the term clustering learned from one data set directly to the documents from another data set.

By establishing multiple sets of clusters pairs that use the same term clusters, the multiple sets of cluster pairs are comparable because they are over the same grounding space. For example, a first set of cluster pairs may be embodied as a m x n1 matrix, where m is number of term clusters 116 derived from the first data set 110 and n1 is the number of document clusters 118 derived from the first data set 110. A second set of cluster pairs may be embodied as a m x n2 matrix, where m is the number of term clusters 116 derived from the first data set 110 and n1 is the number of documents 122 in the second data set 120. In this way, both the first set of cluster pairs and the second set of cluster pairs are mapped to the same term clusters 116 and both sets of cluster pairs have the same number of rows m. As will be discussed in more detail, the first set of cluster pairs is weighted and each column of the weighted first set of cluster pairs is compared to all of the columns of the second set of clustered pairs using a Hellinger divergence. Each column of the first set of cluster pairs (i.e., each document cluster 118) is assigned a column of the second set of cluster pairs (i.e., a document 122) based on the calculated Hellinger score. In some embodiments, a column of the first set of cluster pairs may be assigned multiple columns of the second set of cluster pairs when the Hellinger score exceeds a specific threshold.

The weighting of probability distributions allows for certain terms and term clusters to be valued more than other terms and term clusters when analyzing data sets of information. For example, when analyzing a data set of scientific papers the term "hypothesis" is likely found in every scientific paper and therefore is not a good way to indicate anything specific about the subject matter of the documents in the corpus. However, when analyzing a data set of news articles the term "hypothesis" is more likely to indicate that the subject matter of the news article relates to research and science. Using the weighting scheme described above, the content analyzer subsystem 102 is able to dynamically distinguish between words with little significance in a data set based on the overall data set of information being analyzed, rather than relying on user generated lists of words not to be given any weight.

In the illustrative embodiment, the cluster pair generator 130 generates two sets of cluster pairs. A first set of cluster pairs that applies the term clusters 116 to the document clusters 118 and a second set of cluster pairs that applies the term clusters 116 to the document clusters 128 learned from the second data set 120. These two sets of cluster pairs span the same grounding space and are therefore comparable using various divergence metrics.

The semantic alignment module 148 compares the probability distributions of both sets of cluster pairs to determine similarities between the data sets being analyzed. In the illustrative embodiment, the semantic alignment module 148 uses the Hellinger divergence metric to determine the similarities between the two data sets. In the illustrative embodiment, the weighted probability parameters generated for the first set of cluster pairs may be represented by the vector $\vec{p_k} = \langle p_{11}, p_{12}, \ldots p_{ij} \rangle$, where k represents the specific cluster pair, i represents the specific term cluster of the cluster pair k and j represents the specific document cluster of the cluster pair k. The probability parameters (whether weighted or not) generated for the second set of cluster pairs may be represented by the vector $\vec{p_k} = \langle q_{11}, q_{12}, \ldots c_{i,j} \rangle$, where k represents the specific cluster pair, i represents the specific term cluster of the cluster pair k and j represents the specific document cluster of the cluster pair k. In some embodiments, the vector q is a weighted probability distribution, such as semantic representation 146. In some embodiments, the vector q is composed of term clusters for the first data set 110 and documents 122 from the second data set 120, thereby comparing co-clustered data to non-co-clustered data.

Under these conditions, the similarity determination module calculates the Hellinger divergence using the following equation:

$$H[\vec{p}, \vec{q}] = \frac{1}{\sqrt{2}} \sqrt{\Sigma_k (\sqrt{p_k} - \sqrt{q_k})^2} \quad (2)$$

Using the Hellinger divergence equation above, similarities between the data sets are found by choosing the q that is closest to the p. In other embodiments, the semantic alignment module 148 uses a Kullback-Liebler divergence, or other delta-divergence, to determine similarities. In yet other embodiments, the semantic alignment module 148 uses Euclidean metrics, such as cosine, to determine similarities between corpora.

In the illustrative embodiment, after determining the divergences between the first data set 110 and the second data set 120 based on the mappings to the term clustering learned from the first data set 110, the semantic alignment module 148 generates a similarity metric 150. The similarity metric 150 comprises a mathematical distance between each specificity-weighted semantic representation of a document 112 from the first data set 110 and each semantic representation of a document 122 from the second data set 120. A tag selection module 152 (or "classification module") uses the similarity metric 150 to tag (or classify) individual documents 112 in the data sets according to the task being performed by the content analyzer subsystem 102. If the calculated similarities between the data sets exceed a certain threshold, the tag selection module 152 marks a particular document as having the particular characteristics indicated by the other information.

The tag selection module 152 generates one or more tags 154, 156, 158 related to the different tasks the content analyzer subsystem 102 may optionally perform. A content summary generator module 160 may be configured to receive tags 154 and determine how similar the data sets being compared are. For example, the content summary generator module 160 may apply tags 154 to a document 112 in the first data set 110, where each tag 154 is indicative of information in documents 122 from the second data set 120. In this way, similarities between documents 112, 122 can be marked. A query generator module 162 may be configured to receive tags 156 and determine how certain documents in a data set relate to a specific query by a user. An information retrieval subsystem 164 may be configured to receive tags 158 and retrieve documents from a data set based on information gleaned from another data set. For example, the information retrieval subsystem 164 may tag documents in the first data set 110 such that they are easily retrievable by searching for information included in the tags 158.

Figure 2:
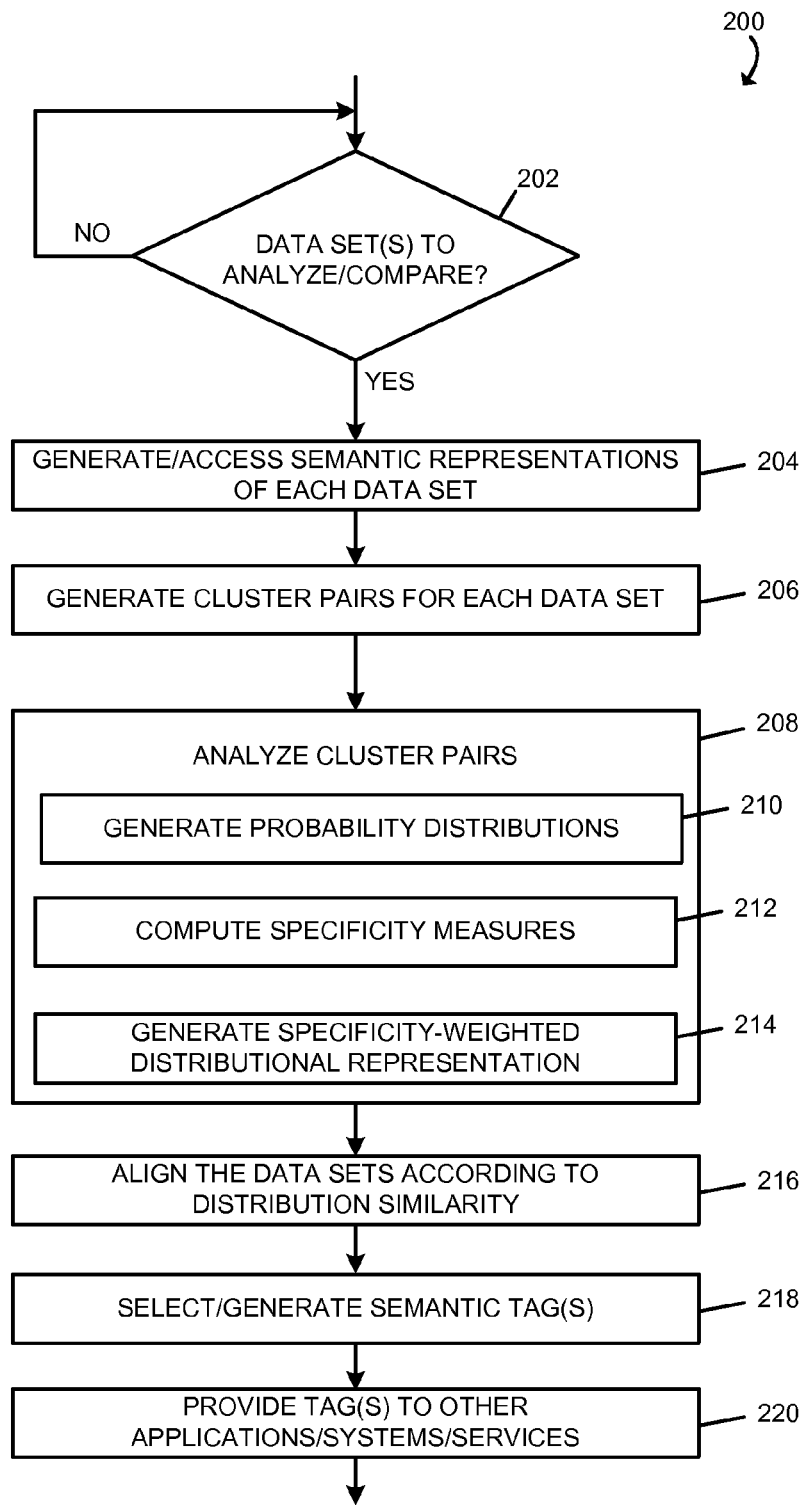
FIG. 2 is a simplified flow diagram of at least one embodiment of a content analysis process executable by a computing system, such as the computing system of FIG. 1.

Referring to FIG. 2, a simplified flow diagram of at least one embodiment of a process 200 executable by the computing system 100 is shown. The process 200 may be embodied as computerized programs, routines, logic and/or instructions executed by the computing system 100, for example by one or more of the modules and other components shown in FIG. 1 described above. At block 202, the computing system 202 determines whether a plurality of data sets have been received to be analyzed or compared. The receiving of data sets may include receiving a command from a user directing the system 100 to access information already stored locally on the computing system 100 and analyze it. In other embodiments, a user uploads new data set of information to the computing system 100, for example, using an external memory (e.g., a flash drive) or by accessing information from the internet or other network.

At block 204, the system 100 generates or accesses semantic representations of each data set. As discussed above, determining semantic representations of each data set is based on linguistic similarities identified through a natural-language machine-learning algorithm. At block 206, the computing system 100 uses the semantic representations to generate cluster pairs for each data set. The sets of cluster pairs are generated based on the comparisons that are to be made between data sets. For instance, if a user wants to determine whether a data set of general scientific papers includes the subject matter related to a data set of climate change papers, the system 100 will apply the clustered data learned from the general scientific papers to the clusters learned from the climate change papers. The types of cluster pairs generated determine the type of similarities that are calculated by the system 100.

At block 208, the system 100 analyzes the cluster pairs and generates probability distributions based on the occurrences of terms from the term cluster of a specific cluster pair in a document, or document cluster, of the specific cluster pair. At block 210, the system 100 generates probability distributions for each cluster pair indicative of a frequency that the terms of the term cluster appear in the document, or document cluster. At block 212, the system 100 computes specificity measures for each of the cluster pairs indicative of how unique the occurrences the specific term cluster in the document, or document cluster, are when compared to all occurrences of the specific term cluster across all of the related documents, or document clusters. At block 214, the system 100 generates a specificity-weighted distributional representation for each cluster pair based on the cluster pair's probability distribution and specificity measure. In this way, terms that occur frequently across the entire set of documents will dynamically be weighted as less relevant, while other terms will dynamically be weighted as more relevant. For example, the term "hypothesis" might be a relevant term when analyzing corpora related to news articles, but the term "hypothesis" is not a relevant term when analyzing corpora related to scientific articles because the word hypothesis likely shows up in all scientific articles.

Once all of the semantic representations, at block 216, the system 100 aligns the data sets according to distribution similarity. In the illustrative embodiment, term clusters and document clusters are derived from a first data set. The term clusters are compared to the document clusters from the first corpus and are compared to a set of documents, or document clusters, derived from a second data set. By so doing, the content of the second data set is mapped onto the first data set. At block 218, the system 100 generates one or more semantic tags to apply to the documents of the sets being compared. At block 220, the system 100 provides the tags to other applications, systems, or services so that these other systems can use the tags to perform their own comparisons.

Figure 3:
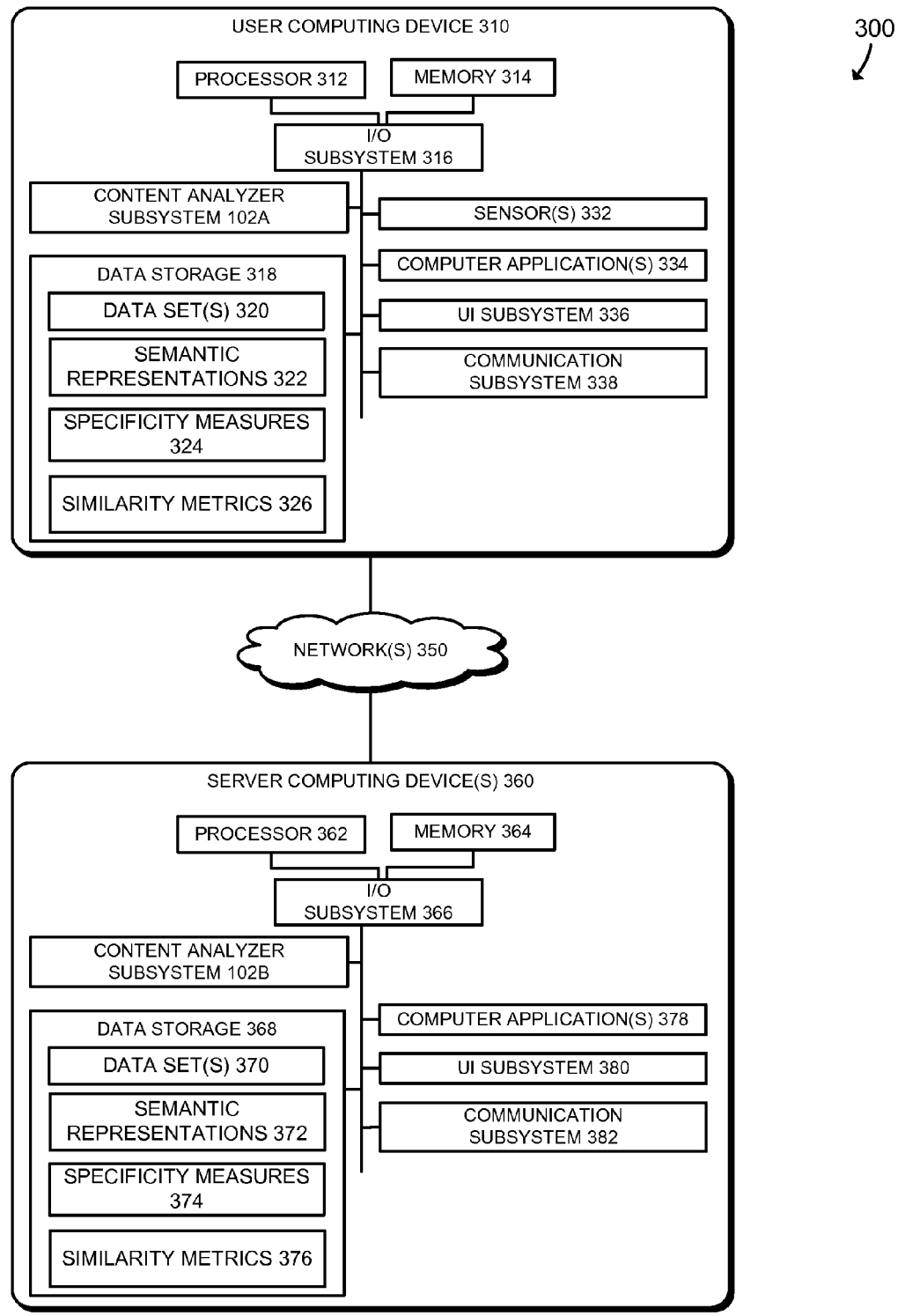
FIG. 3 is a simplified block diagram of at least one embodiment of a computing environment in which the content analyzer subsystem of FIG. 1 may be implemented.

Referring now to FIG. 3, a simplified block diagram of an embodiment 300 of the computing system 100 is shown. While the illustrative computing system 300 is shown as involving multiple computing devices, it should be understood that in some embodiments, the computing system 300 may constitute a single computing device alone. The computing system 300 includes a user computing device 310, which may be in communication with one or more server computing devices 360 via one or more networks 350. The content analyzer subsystem 102, or portions thereof, may be distributed across multiple computing devices 310, 360 that are connected to the network(s) 350 as shown. In other embodiments, however, the content analyzer subsystem 102 may be located entirely on the computing device 310. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a search engine, content organization system, content management system, big data analytics applications, and/or other, applications, systems and devices. As used herein, "module," "component," "subsystem" and similar terminology may refer to computer code, i.e., software developed using a programming language such as Java, Python, or C++, which may be stored in computer memory, e.g., as executable instructions embodied in one or more transitory or non-transitory computer readable media.

The illustrative computing device 310 includes at least one processor 312 (e.g. a microprocessor, microcontroller, digital signal processor, etc.), memory 314, and an input/output (I/O) subsystem 316. The computing device 310 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 316 typically includes, among other things, an I/O controller, a memory controller, and one or more I/O ports. The processor 312 and the I/O subsystem 316 are communicatively coupled to the memory 314. The memory 314 may be embodied as any type of suitable computer memory device (e.g., volatile memory such as various forms of random access memory).

The I/O subsystem 316 is communicatively coupled to a number of hardware and software components and/or other computing systems including a "front end" of the content analyzer subsystem 102A, a user interface subsystem 336, which includes one or more user input devices (e.g., one or more microphones, touchscreens, keyboards, virtual keypads, etc.) and one or more output devices (e.g., speakers, displays, LEDs, haptic devices, etc.). The I/O subsystem 316 is also communicatively coupled to a number of sensors 332, one or more data storage media 318, one or more computer applications 334, and a communication subsystem 338. It should be understood that each of the foregoing components and/or systems may be integrated with the computing device 310 or may be a separate component or system that is in communication with the I/O subsystem 316 (e.g., over a network 350 or a serial bus connection).

The data storage media 318 may include one or more hard drives or other suitable data storage devices (e.g., flash memory, memory cards, memory sticks, and/or others). In some embodiments, portions of the content analyzer subsystem 102A, data set(s) 320, semantic representations 322, specificity measures 324, similarity metrics 326 and/or other data reside at least temporarily in the data storage media 318. Portions of the content analyzer subsystem 102A and/or other data may be copied to the memory 314 during operation of the computing device 310, for faster processing or other reasons.

The communication subsystem 338 may communicatively couple the computing device 310 to one or more communication networks 350, e.g., a local area network, wide area network, personal cloud, enterprise cloud, public cloud, and/or the Internet, for example. Accordingly, the communication subsystem 338 may include one or more wired or wireless network interface software, firmware, or hardware, for example, as may be needed pursuant to the specifications and/or design of the particular computing system 100.

The server computing device(s) 360 may be embodied as any suitable type of computing device capable of performing the functions described herein, such as any of the aforementioned types of devices or other electronic devices. For example, in some embodiments, the server computing device(s) 360 may include one or more server computers including data storage media 368, which may be used to store "back end" portions of the content analyzer subsystem 102B, data set(s) 370, semantic representations 372, specificity measures 374, similarity metrics 376 and/or other data. The illustrative server computing device 360 includes one or more processors 362, memory 364, an I/O subsystem 366, data storage media 368, computer applications 378, a user interface subsystem 380, and a communication subsystem 382, each of which may be embodied similarly to the corresponding components of the user computing device 310, respectively, described above. The computing system 300 may include other components, sub-components, and devices not illustrated in FIG. 3 for clarity of the description. In general, the components of the computing system 300 are communicatively coupled as shown in FIG. 3 by signal paths, which may be embodied as any type of wired or wireless signal paths capable of facilitating communication between the respective devices and components.

EXAMPLES OF USE

The content analyzer subsystem 102 may be used to map unstructured data onto a user-defined taxonomy of categories and thereby produce more pertinent information about the corpora of information being analyzed. When using unsupervised machine learning techniques to analyze unstructured data, the results that are produced may not be the most salient to users. For example, unsupervised learning techniques may produce term clusters that may not be readable to a user, may not be self-descriptive, or may not be truly relevant to the information sought by the user. Another potential drawback to unsupervised learning techniques is that clusters only refer to the corpus being analyzed, and do not include any references to any information outside of the specific corpus. While user tagging of documents with user-defined taxonomies ameliorates many of the above-mentioned problems with unsupervised machine learning techniques, user tagging suffers its own problems of the possibility of user error and a static set of categories that cannot dynamically change. By comparing a corpus of information to a user-defined taxonomy of categories using unsupervised machine learning, the content analyzer subsystem 102 is capable of producing better results than using either of the two methods alone.

Referring to FIG. 1, using the content analyzer subsystem 102 to map a data set to a taxonomy of categories includes defining the target corpora of information as the first corpus of the system shown in FIG. 1, and defining the taxonomy of categories as the second corpus. In the illustrative embodiment discussed above, the content analyzer subsystem 102 will then apply co-clustering algorithms to both the first corpora and the second corpora and eventually tag documents of the first corpora with markers indicating what information in the second corpora is similar.

In a specific example of using the content analyzer subsystem 102 is used to classify National Science Foundation (NSF) grant proposals into a standard classification for scientific disciplines. In this example, the NSF grant proposals are defined as the first corpus and a standard classification scheme for scientific disciplines is defined as the second corpus of the illustrative embodiments discussed above in FIG. 1.

In the illustrative example, the standard classification scheme is based on The National Center for Education Statistics' Classification of Instructional Programs (CIP), which provides a taxonomic scheme to support the tracking, assessment, and reporting of fields of study and program completions activity. The second corpus of information was composed of a number of scientific disciplines derived from the CIP information. Each scientific discipline in the second corpus included a 500-word description of terms and phrases that describe the scientific discipline.

By using the comparison techniques discussed above to compare a corpus of unstructured data (e.g., the NSF grant proposals) to a corpus of user-defined categories (e.g., the scientific disciplines derived from the CIP information), the content analyzer subsystem 102 is able to provide useful information to the user about the unstructured data. The content analyzer subsystem 102 allows the user to dynamically search unstructured data for any type of information. Whereas user-tagged systems require the user to define when a document is tagged what information can be gleaned later from the corpus of documents.

In another example, the content analyzer subsystem 102 can be used to glean tangential information from a corpus of unstructured data, such as glean socioeconomic objectives from a corpus of information. Returning again to the corpus of NSF grant proposals, many grant proposals apply rigorous scientific testing to solve socioeconomic problems, but the socioeconomic objectives are not always readily discoverable using unsupervised machine learning techniques. By defining a second corpus made up of user-defined socioeconomic classifications, the content analyzer subsystem 102 can map the unstructured data (e.g., the NSF grant proposals) to socioeconomic classifications. This allows a user to search a group of documents and glean what documents are directed to solving a particular socioeconomic problem, such as, for example, climate change.

In yet another example, the content analyzer subsystem 102 can be used to track trends from year to year in specific data sets. If the first corpus of information is defined as work product from a given year and the second corpus of information is defined as work product from a subsequent year, the content analyzer subsystem 102 can track trends in data across time. The content analyzer subsystem 102 allows a user to glean any type of information from unstructured data and uses unsupervised machine learning techniques to assure speedy and accurate results.

ADDITIONAL EXAMPLES

Illustrative examples of the technologies disclosed herein are provided below. An embodiment of the technologies may include any one or more, and any combination of, the examples described below.

In an example 1, a method for semantically aligning a data set with a different data set includes a plurality of documents, the data set represented by a plurality of document clusters and a plurality of term clusters, the document clusters and the term clusters algorithmically derived from the data set, the document clusters each comprising at least one document and the term clusters each comprising at least one term, the method includes, by a computing system that includes one or more computing devices: creating a specificity-weighted semantic representation of the data set by, for each document cluster-term cluster pair of the data set: (i) computing a specificity measure indicative of a likelihood of occurrence of the term cluster in the document cluster in relation to a likelihood of occurrence of the term cluster in the other document clusters of the data set and (ii) associating each specificity measure with its respective document cluster-term cluster pair; accessing a semantic representation of the different data set, the different data set represented by a different plurality of document clusters and a different plurality of term clusters, the semantic representation of the different data set comprising, for each document cluster in the different data set, at least data indicative of a likelihood of occurrence of each of the different plurality of term clusters in the document cluster; with the specificity measures, algorithmically comparing the semantic representation of the data set to the semantic representation of the different data set; selecting a subset of the term clusters of the data set based on the comparison of the semantic representation of the data set to the semantic representation of the different data set; and associating the selected subset of term clusters with one or more documents of the data set.

An example 2 includes the subject matter of example 1, and includes generating one or more metatags for the data set, the one or more metatags comprising one or more terms in the selected subset of term clusters. An example 3 includes the subject matter of example 1, and includes supplementing a set of existing tags for the data set with one or more terms of the selected subset of term clusters. An example 4 includes the subject matter of example 1, and includes generating a summary of the content of the data set, wherein the summary comprises one or more of the terms in the selected subset of term clusters. An example 5 includes the subject matter of example 1, and includes generating a search query comprising one or more terms of the selected subset of term clusters. An example 6 includes the subject matter of examples 1 and 5, and includes executing the search query to retrieve content from the different data set that is semantically similar to content of the data set. An example 7 includes the subject matter of example 1, and includes selecting the subset of the term clusters of the data set by omitting terms that do not appear in any of the term clusters of the different data set. An example 8 includes the subject matter of example 1, and includes creating the semantic representation of the data set as a probability distribution over the term clusters of the data set and weighting each entry in the probability distribution based on the computed specificity measure. An example 9 includes the subject matter of example 1, and includes, for each document cluster-term cluster pair, computing the specificity measure as a ratio of an observed count of terms of the term cluster occurring in documents of the document cluster to an expected count of terms from the term cluster occurring in the document cluster. An example 10 includes the subject matter of example 1, and includes the semantic representation of the data set and the semantic representation of the different data set each comprise a different probability distribution, and computing the similarity metric comprises determining an information distance between the two probability distributions. An example 11 includes the subject matter of example 1, where the data set and the different data set comprise two different types of content. An example 12 includes the subject matter of example 1, where the semantic representation of the different data set includes the plurality of term clusters algorithmically derived from the data set and information from the different data set, where the semantic representation of the different data set is a distribution across the same grounding space as the semantic representation of the data set.

In an example 13, a content analysis subsystem embodied in one or more machine accessible storage media and includes instructions executable to cause a computing system comprising one or more computing devices to, with a plurality of distinct data sets including at least a data set and a different data set, the data set and the different data set comprising distinct sets of documents, each document comprising a plurality of terms algorithmically extracted from the document: create a specificity-weighted semantic representation of the data set by, for each document-term pair of the data set: (i) computing a specificity measure indicative of a likelihood of occurrence of the term in the document in relation to a likelihood of occurrence of the term in the other documents of the data set and (ii) associating each specificity measure with its respective document-term pair; access a semantic representation of the different data set; compute a similarity metric comprising a mathematical distance between each specificity-weighted semantic representation of a document from the data set and each semantic representation of a document from the different data set; select a subset of terms of the data set based on the similarity metric; and associate the selected subset of terms with one or more documents of the data set.

An example 14 includes the subject matter of example 13, and includes instructions configured to cause the computing system to create the semantic representation of the data set as a probability distribution over the terms of the data set and assign a weight to each entry in the probability distribution based on the computed specificity measure for the corresponding document-term pair. An example 15 includes the subject matter of example 13 or example 14, and includes instructions configured to cause the computing system to increase the weight of an entry in the probability distribution if the computed specificity measure indicates that the term of the corresponding document-term pair has a high degree of correlation with the document. An example 16 includes the subject matter of example 13 or example 14, and includes instructions configured to cause the computing system to decrease the weight of an entry in the probability distribution if the computed specificity measure indicates that the term of the corresponding document-term pair has a low degree of correlation with the document. An example 17 includes the subject matter of example 13, and includes instructions configured to cause the computing system to, for each document-term pair, compute the specificity measure as a ratio of an observed count of occurrences of the term in the document to an expected count of occurrences of the term in the document. An example 18 includes the subject matter of example 13, and where the semantic representation of the different data set includes the plurality of term clusters algorithmically derived from the data set and information from the different data set, where the semantic representation of the different data set is a distribution across the same grounding space as the semantic representation of the data set.

In an example 13, a method for determining semantic content of a data set, the data set comprising a plurality of documents, the data set represented by a plurality of document clusters and a plurality of term clusters, the document clusters and the term clusters algorithmically derived from the data set, the document clusters each including at least one document and the term clusters each comprising at least one term, the method including, by a computing system comprising one or more computing devices: creating a semantic representation of the data set by, for each document cluster-term cluster pair of the data set: (i) computing a specificity measure indicative of a likelihood of occurrence of the term cluster in the document cluster in relation to a likelihood of occurrence of the term cluster in the other document clusters of the data set and (ii) associating each specificity measure with its respective document cluster-term cluster pair; based on the specificity measures, selecting a subset of the term clusters of the data set; and associating the selected subset of term clusters with one or more documents of the data set.

An example 20 includes the subject matter of example 19, and includes generating a search query comprising one or more of the terms in the selected subset of term clusters. An example 21 includes the subject matter of example 19, and includes generating a summary of the content of the data set, wherein the summary comprises one or more of the terms in the selected subset of term clusters. An example 22 includes the subject matter of example 19 or example 22, and includes generating one or more metatags for the data set, the one or more metatags comprising one or more terms in the selected subset of term clusters.

In an example 23, a method for classifying one or more items of an unclassified data set, the method including, with a computing system including one or more computing devices: accessing a plurality of models, each model comprising a set of characteristic features associated with a property of the model; extracting a plurality of features from each of the items in the unclassified data set; for each of the extracted features, computing a specificity measure of the extracted feature in relation to other features of the unclassified data set; using the specificity measure, for the one or more items in the unclassified data set, with each of the models, measuring the similarity of the extracted features to the set of characteristic features associated with the property of the model; and selecting a model to classify the one or more items of the unclassified data set based on the similarity measure.

An example 24 includes the subject matter of example 23, and includes assigning a weight to each of the extracted features based on the specificity measure. An example 25 includes the subject matter of example 23 or example 24, and includes assigning a higher value as the weight if the extracted feature has a higher specificity measure. An example 26 includes the subject matter of example 23, example 24, example 25 or any combination thereof, and includes assigning a lower value as the weight if the extracted feature has a lower specificity measure. An example 27 includes the subject matter of example 23, and where the plurality of models comprises a plurality of language models, the property of each model relates to a classification criterion of the model, and the characteristic features of each model comprise terms associated with the classification criterion. An example 28 includes the subject matter of example 23 or claim 27, and where the one or more items of the unclassified data set comprises a plurality of documents and the plurality of features extracted from the one or more items comprises a set of terms. An example 29 includes the subject matter of example 23, example 27, example 28 or any combination thereof, and includes determining the extracted features by executing a co-clustering technique or by prioritizing the extracted features based on distinctiveness of the extracted features. An example 29 includes the subject matter of example 23, example 27, example 28, example 29 or any combination thereof, and includes determining the distinctiveness of an extracted feature based on the number of occurrences of the extracted feature in the one or more items in comparison to the number of occurrences of the extracted feature in the unclassified data set as a whole.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof (e.g., software written using a programming language such as Java, C++, and/or Python). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for semantically aligning data sets, the method comprising, by a computing system comprising one or more computing devices:
   receiving, by an unsupervised machine learning-based process, first and second data sets;
   using the unsupervised machine learning-based process to sort at least the first data set into cluster pairs;
   wherein a cluster pair comprises a term cluster and a document cluster;
   wherein a term cluster comprises a set of terms found by the unsupervised machine learning-based process in the first data set;
   wherein a document cluster comprises a set of documents found by the unsupervised machine learning-based process in the first data set;
   generating a probability distribution for a cluster pair;
   wherein the probability distribution indicates similarities between terms in the term cluster and documents in the document cluster;
   applying a specificity weight to the probability distribution to produce a specificity-weighted probability distribution;
   wherein the specificity weight indicates, for the cluster pair, whether a frequency of occurrence of the term cluster in the document cluster of the cluster pair is greater than an average frequency of occurrence of the term cluster in all document clusters;
   causing the one or more computing devices to use the specificity-weighted probability distribution to assign tags to items of the first data set;
   wherein the tags indicate items of the second data set that are semantically similar to the items of the first data set.

2. The method of claim 1, wherein the first data set comprises unstructured data and the second data set comprises a language model.

3. The method of claim 2, wherein the language model indicates sets of related words and tags associated with the sets of related words.

4. The method of claim 1, wherein the first data set comprises unstructured data and the second data set comprises a reference classification scheme.

5. The method of claim 1, wherein the first data set comprises searchable electronic files and the second data set comprises an ontology.

6. The method of claim 1, wherein the unsupervised machine learning-based process comprises any one or more of the following: a co-clustering process, a Latent Dirichlet Allocation (LDA) process.

7. The method of claim 1, comprising computing a similarity metric that indicates a mathematical distance between the specificity-weighted probability distribution and a probability distribution of the second data set.

8. The method of claim 7, comprising, when the similarity metric exceeds a threshold, tagging an item of the first data set.

9. The method of claim 7, wherein the similarity metric is computed using any one or more of the following: a divergence metric, a Hellinger divergence, a Euclidean metric, a cosine metric, a Kullback-Liebler divergence, a delta-divergence, an information-theoretic similarity metric.

10. The method of claim 1, comprising causing the one or more computing devices to perform any one or more of the following: (i) providing the tags to a content summary generator process that is configured to generate a summary of content of the first data set, (ii) providing the tags to a query generator process that is configured to generate a search query, (iii) sending the tags to an information retrieval subsystem that is configured to retrieve content from the first data set that is semantically similar to content of the second data set.

11. A content analysis subsystem embodied in one or more machine accessible storage media and comprising instructions executable to cause a computing system comprising one or more computing devices to perform operations comprising:
   receiving, by an unsupervised machine learning-based process, first and second digital data sets;
   using the unsupervised machine learning-based process to sort at least the first data set into cluster pairs;
   wherein a cluster pair comprises a term cluster and a document cluster;
   wherein a term cluster comprises a set of terms found by the unsupervised machine learning-based process in the first data set;
   wherein a document cluster comprises a set of documents found by the unsupervised machine learning-based process in the first data set;
   generating a probability distribution for a cluster pair;
   wherein the probability distribution indicates similarities between terms in the term cluster and documents in the document cluster;
   applying a specificity weight to the probability distribution to produce a specificity-weighted probability distribution;
   wherein the specificity weight indicates, for the cluster pair, whether a frequency of occurrence of the term cluster in the document cluster of the cluster pair is greater than an average frequency of occurrence of the term cluster in all document clusters;
   causing the one or more computing devices to use the specificity-weighted probability distribution to assign tags to items of the first data set;
   wherein the tags indicate items of the second data set that are semantically similar to the items of the first data set.

12. The content analysis subsystem of claim 11, wherein the first data set comprises unstructured data and the second data set comprises a language model.

13. The content analysis subsystem of claim 12, wherein the language model indicates sets of related words and tags associated with the sets of related words.

14. The content analysis subsystem of claim 11, wherein the first data set comprises unstructured data and the second data set comprises a reference classification scheme.

15. The content analysis subsystem of claim 11, wherein the first data set comprises searchable electronic files and the second data set comprises an ontology.

16. The content analysis subsystem of claim 11, wherein the unsupervised machine learning-based process comprises any one or more of the following: a co-clustering process, a Latent Dirichlet Allocation (LDA) process.

17. The content analysis subsystem of claim 11, wherein the instructions, when executed, cause the computing system to perform operations comprising computing a similarity metric that indicates a mathematical distance between the specificity-weighted probability distribution and a probability distribution of the second data set.

18. The content analysis subsystem of claim 17, wherein the instructions, when executed, cause the computing system to perform operations comprising, when the similarity metric exceeds a threshold, tagging an item of the first data set.

19. The content analysis subsystem of claim 17, wherein the similarity metric is computed using any one or more of the following: a divergence metric, a Hellinger divergence, a Euclidean metric, a cosine metric, a Kullback-Liebler divergence, a delta-divergence, an information-theoretic similarity metric.

20. The content analysis subsystem of claim 11, wherein the instructions, when executed, cause the computing system to perform operations comprising causing the one or more computing devices to perform any one or more of the following: (i) providing the tags to a content summary generator process that is configured to generate a summary of content of the first data set, (ii) providing the tags to a query generator process that is configured to generate a search query, (iii) sending the tags to an information retrieval subsystem that is configured to retrieve content from the first data set that is semantically similar to content of the second data set.

21. A method comprising:
   using an unsupervised machine learning-based process to sort at least a first data set into cluster pairs;
   wherein a cluster pair comprises a term cluster and a document cluster;
   wherein a term cluster comprises a set of terms found by the unsupervised machine learning-based process in the first data set;
   wherein a document cluster comprises a set of documents found by the unsupervised machine learning-based process in the first data set;
   generating a probability distribution for a cluster pair;
   wherein the probability distribution indicates similarities between terms in the term cluster and documents in the document cluster;
   applying a specificity weight to the probability distribution to produce a specificity-weighted probability distribution;
   wherein the specificity weight indicates, for the cluster pair, whether a frequency of occurrence of the term cluster in the document cluster of the cluster pair is greater than an average frequency of occurrence of the term cluster in all document clusters;
   causing the one or more computing devices to use the specificity-weighted probability distribution to assign tags to items of the first data set;
   wherein the method is performed by one or more computing devices.

22. The method of claim 21, wherein the first data set comprises unstructured data.

23. The method of claim 21, wherein the tags are associated with sets of related words.

24. The method of claim 21, wherein the tags are associated with a reference classification scheme.

25. The method of claim 21, wherein the tags are associated with an ontology.

26. The method of claim 21, wherein the unsupervised machine learning-based process comprises any one or more of the following: a co-clustering process, a Latent Dirichlet Allocation (LDA) process.

27. The method of claim 21, comprising computing a similarity metric that indicates a mathematical distance between the specificity-weighted probability distribution and a probability distribution of a second data set.

28. The method of claim 27, comprising, when the similarity metric exceeds a threshold, tagging an item of the first data set.

29. The method of claim 27, wherein the similarity metric is computed using any one or more of the following: a divergence metric, a Hellinger divergence, a Euclidean metric, a cosine metric, a Kullback-Liebler divergence, a delta-divergence, an information-theoretic similarity metric.

30. The method of claim 21, comprising causing the one or more computing devices to perform any one or more of the following: (i) providing the tags to a content summary generator process that is configured to generate a summary of content of the first data set, (ii) providing the tags to a query generator process that is configured to generate a search query, (iii) sending the tags to an information retrieval subsystem that is configured to retrieve content from the first data set that is semantically similar to content of a second data set.

* * * * *